Dec. 21, 1948.  O. H. BANKER  2,456,614
MARINE REVERSING GEAR
Filed Sept. 30, 1943
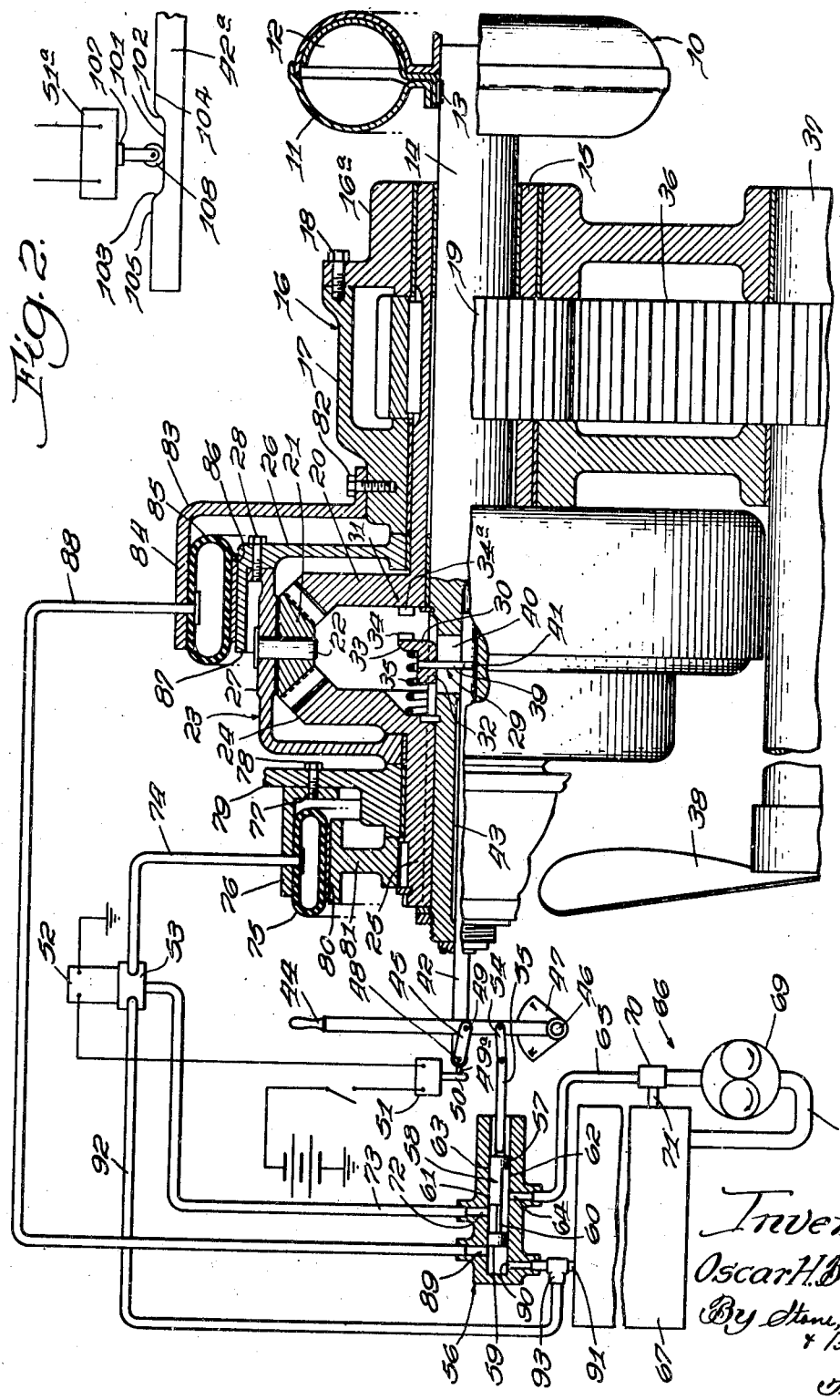
Inventor
Oscar H. Banker.
By Stone, Artman
 & Bisson
Attys Patented Dec. 21, 1948

2,456,614

UNITED STATES PATENT OFFICE 2,456,614

MARINE REVERSING GEAR

Oscar H. Banker, Evanston, Ill., assignor to New Products Corporation, Chicago, Ill., a corporation of Delaware Application September 30, 1943, Serial No. 504,385

7 Claims. (Cl. 74—297)

This invention relates to plural power train drive mechanisms, and particularly to a reversible driving mechanism for the propeller shafts of marine craft.

An object of the invention is the provision of simplified means for transmitting power from an engine to a propeller shaft in selected directions at a desired speed ratio.

Another object of the invention is the provision of a novel power transmission wherein brakes are utilized respectively to resist rotation of the propeller shaft while the transmission is in neutral and to reverse the direction of drive of the propeller shaft.

A further object of the invention is the provision, in a power transmission mechanism, of hydraulic control means for obtaining neutral and reverse positions of the driven parts.

A further object is the provision in a marine driving gear having selectively establishable power trains for driving a propeller shaft in opposite directions of a power train control and a brake operable under the influence of said control to apply a braking action upon the propeller shaft to expedite a shift from either power train to the other.

A further object is the provision in a marine reversing gear of a jaw clutch engageable to establish one of the power trains in driving relation between the power source and the propeller shaft, together with a power train shifter and a brake and novel control therefor operable under control of such shifter to resist rotation of the propeller shaft until the engageable parts of the clutch are synchronized.

Other objects and advantages of the invention will become clear from the following detailed description, when considered in conjunction with the accompanying drawing, wherein:

Fig. 1 is a view partly schematic and partly in section, illustrating a preferred embodiment of the invention; and Fig. 2 is a diagrammatic view of a modified form of switch and operating cam therefor.

In the drawing, it may be noted that the numeral 10 designates a mechanism in the form of a fluid coupling, which derives power from a suitable source, not shown, and which comprises generally a driving element 11 and a driven element 12. Element 12 is keyed, as indicated at 13, to one end of a shaft 14, rotatably mounted in a sleeve 15, which, in turn, is journaled in a casing 16. Casing 16 comprises sections 16a and 17, separably joined by bolts 18, and has a cavity therein to accommodate a pinion 19, splined to the sleeve 15. Integral with an end of sleeve 15 is a beveled gear 20, adapted to mesh with one side of planet gears 21, which are freely rotatable upon respective shafts 22 affixed to the wall of a carrier 23. Engaging the opposite side of gear 21 is a beveled gear 24, having an integral sleeve portion 25 splined to shaft 14.

Carrier 23, in which planet gears 21 are mounted, is U-shaped in cross-section, and comprises two portions 26 and 27, joined by bolts 28. Carrier 23 straddles the gears 20 and 24, and is journaled for rotation on sleeve portions 15 and 25, respectively. Driving connection between shaft 14 and sleeve 15 to cause rotation thereof may be effected by means of a jaw clutch 29, comprising driving and driven elements 30 and 31 each consisting of a plurality of teeth 34 and 34a spaced circumferentially about the axes of said sleeve and shaft and axially meshable. Driving element 30 is splined to shaft 14 and includes a shank 32 and a flange portion 33 carrying the teeth 34. Clutch elements 30 and 31 are biased to engaged position by a coil spring 35, surrounding the shank 32, and abutting flange portion 33 at one end and bevel gear 24 at the other.

Upon engagement of the clutch 29 it should be clear that power transmitted through the fluid coupling 10 rotates the shaft 14 and, through the clutch engagement, gear 20. Gear 24, splined to shaft 14, is likewise rotated, as are planet gear 21 and its carrier 23, as a unit with shaft 14. The rotation of gear 20 with its sleeve 15 revolves pinion 19, which meshes with and turns a gear 36, affixed to a propeller shaft 37, having at the end thereof a propeller 38.

The drive just outlined propels the craft, in which the mechanism is installed, in a forward direction. The mechanism by which the clutch 29 is controlled, and by which the driven parts may be neutralized, or the direction of propulsion reversed, will now be described.

A pin 39, affixed to the driving clutch element 30, extends downwardly therefrom into a slot 40 in shaft 14 and engages a groove 41 circumscribing one end of a rod 42. Rod 42 extends into an axial opening 43 in the end of shaft 14 communicating with slot 40, and is adapted to be reciprocated to engage or disengage the clutch 29. The other end of rod 42 is connected to a lever 44, intermediate its length, through the intermediary of a pivoted link 45 attached to the lever 44. Lever 44 is pivoted at 46 upon a quadrant 47, and is manually operable to open or close clutch 29 by reciprocating movement of rod 42. Link 45 is attached to the end of rod 42 by a pin 48 and to the lever 44 by a pin 49. A reduced end portion 49a of the rod 42 is abuttable against a lever 50 of an electric switch 51 to control the opening and closing of this switch. When the switch 51 is closed it causes energization of a solenoid 52, which controls a valve 53 in a manner and for a purpose that will become clear hereinafter.

Also connected to lever 44 is a link 54, to which is connected a crosshead link 55. Link 55 is adapted for insertion in the open end of the bore in the casing of a valve 56, and is connected to the front plunger portion 57 of a piston, generally indicated at 58, and including a second plunger portion 59 connected to plunger portion 57 by a small diameter portion 60. Plunger 57 is provided with an offset portion 61 spaced from the lower wall 62 of valve 56, but engaging the upper wall 63 thereof. An inlet opening 64 is provided in the lower wall 62 of the valve for connection with a pipe 65 leading to a fluid supply and pump arrangement, generally indicated at 66 and including a fluid reservoir 67, connected by a conduit 68 to a pump 69. Fluid from reservoir 67 is pumped through pipe 65 into valve 56 through the opening 64 therein, and a high pressure relief valve 70 is provided in pipe line 65 and connected to the fluid reservoir by a by-pass conduit 71.

In the position of the lever 44 shown in the drawing, the drive is in neutral and the switch 51 is closed. In this position, fluid from pump 69 is forced into the space between plunger portions 57 and 59 and passes upward through an opening 72 in the upper wall of valve 56 into a pipe 73 to valve 53, and thence to a pipe 74, which opens into an inflatable annular envelope 75. The outer surface of envelope 75 is bonded to an annular support member 76, having a radial flange 77, fixed by bolts 78 to an end wall 79 of casing 16. The inner surface of envelope 75 has bonded thereto a brake shoe 80 comprising elements spaced slightly circumferentially of the envelope. Upon the entrance of fluid into envelope 75 and expansion thereof, shoe 80 engages the outer surface of a drum 81, splined to the sleeve 25.

A casing portion 83 connected with the casing portion 17 by bolts 82 has an annular inflatable envelope bonded thereto at a section 84. The inner surface of envelope 85 has bonded thereto a brake shoe 86 similar to 80. Upon inflation of envelope 85, shoe 86 contacts the outer surface of a drum 87 in the form of an annular flange integral with portion 26 of carrier 23. Fluid for inflating the envelope 85 may be conducted thereto through a pipe 88 leading from an opening 89 in the upper wall of valve 56.

As viewed in the drawing, when the lever 44 is in neutral position, fluid from pump 69 cannot enter the pipe 88, but is conducted in the manner described to envelope 75, while fluid in envelope 85 may be returned through pipe 88 to opening 89 in valve 56, and thence through an opening 90 in the lower wall of the valve into a conduit 91 leading to the fluid reservoir 67. Upon the application of pressure by envelope 75 to drum 81, the drum is rendered stationary, immobilizing the sleeve portion 25 and, therefore, shaft 14.

Upon movement of lever 44 to the forward position indicated on the quadrant 47 by the letter "F," the clutch element 30 is moved into engagement with driven element 31, switch 51 is opened, and piston 58 is retracted until plunger portion 59 covers the opening 72 in the upper wall of valve 56, thus effectively blocking passage of fluid from pump 69 through the valve. The opening of switch 51 de-energizes solenoid 52 to adjust the three-way valve 53 for establishing communication between conduits 74 and 92. From envelope 75 fluid then exhausts through valve 53 into the conduit 92, connected to conduit 91 at 93, and thence to reservoir 67. Simultaneously, fluid from envelope 85 is permitted to exhaust through pipe 88 into the valve 56 and thence through opening 90 and conduit 91 into reservoir.

In the forward position of lever 44 just described, with clutch 29 engaged and fluid exhausted from envelopes 75 and 85, power transmitted through the fluid coupling 10 rotates the shaft 14, and all of the parts mounted thereupon are rotated with it, including pinion 19, which meshes with gear wheel 36 and turns propeller shaft 37 in a direction to impart forward propulsion to the water craft in which it is mounted.

Upon movement of lever 44 to the reverse position indicated by the letter "R" on quadrant 47, switch 51 is again opened. Piston 58 is moved to the left and plunger portion 59 closes the opening 90 in the lower wall of valve 56, while the offset portion 61 of plunger 57 closes the opening 72 in the upper wall of the valve. Fluid from pump 69 is then forced into valve 56 and passes through opening 89 into pipe 88, and thence to envelope 85. Fluid exhausted from the neutral brake envelope 75 exhausts through pipe 74, valve 53 and pipe 92 back to the fluid reservoir 67. The inflation of envelope 85 causes engagement of the reverse brake shoe 86 with the drum 87, thus holding the carrier 23 against rotation. Movement of the lever 44 to the left has released clutch 29, and power transmitted through fluid coupling 10 rotates shaft 14 and beveled gear 24. Beveled gear 24, meshing with planet gears 21, and rotating in one direction, causes rotation of beveled gear 20 in the opposite direction, drive power thus being transmitted to pinion 19, gear 36 and propeller shaft 37 for reverse propulsion.

In Fig. 2 a clutch operating rod 42a corresponding to the rod 42 in Fig. 1 is formed with a cam profile having a low portion 101 between rises 102 and 103 and high portions 104 and 105. The switch 51a corresponding to the switch 51 has an axially movable actuator which causes the switch to be closed while said actuator is in a lowered position when the profile section 101 registers therewith in the neutral position of the rod. When the rod is moved either to the left or to the right to establish reverse or forward, the roller will be advanced up the inclines 103 or 102 to open the switch 51a. Thus the switch 51a is operated in the same coordinate sequence with the rod 42a as the switch 51 with respect to the rod 42.

Employment of the neutral brake 80, in addition to expediting synchronization of the jaw clutch members, is effective for holding the drive shaft 14 from rotating because of the impositive force transmitted through the fluid coupling 10 while the driving motor is idling and the transmission is in neutral. Thus the simple type of fluid coupling is employable as distinguished from the more complex coupling having means for emptying the fluid therefrom to keep the driven member 12 from rotating while the transmission is in neutral.

I claim:

1. In a drive mechanism, in combination, a drive shaft, a driven shaft, and means drivingly connecting said shafts for rotation of said driven shaft in opposite directions from the drive shaft comprising a first gear journaled on said drive shaft, a second gear mounted on said drive shaft to rotate therewith, a planet gear having opposite sides engaging said gears, a carrier for said planet gear rotatably mounted with respect to said drive shaft, means including engageable clutch parts for drivingly engaging said drive shaft and said first gear to rotate said driven shaft in one direction, means responsive to separation of said clutch parts for stopping rotation of said drive and driven shafts, brake means appliable to constrain rotation of the carrier and thereby condition the driving means for rotating the driven shaft in the opposite direction, and means responsive to further separation of said clutch parts for applying said brake means.

2. In a drive mechanism, in combination, a drive shaft, a first gear on said drive shaft, a brake on said first gear for optionally immobilizing said drive shaft, a second gear journaled on said shaft, a carrier journaled on said shaft, a planet gear on said carrier engaging said first and second gears, a brake on said carrier for optional immobilization thereof to permit rotation of said first and second gears in opposite directions, connecting means operable for drivingly connecting said second gear and said drive shaft, and means operable coordinately with said connecting means to cause the released condition of both brakes as a condition precedent to the connecting operation of said connecting means.

3. In a drive mechanism, in combination, a drive shaft, a first gear on said drive shaft, a brake on said first gear for optionally immobilizing said drive shaft, a second gear journaled on said shaft, a carrier journaled on said shaft, a planet gear on said carrier engaging said first and second gears, a brake on said carrier for optional immobilization thereof to cause rotation of said first and second gears in opposite directions, means operable in the released position of said brakes for drivingly connecting said second gear and said drive shaft, fluid energized means for operating said brakes, a source of energizing fluid, conduits for establishing communication between said source and said fluid energized brake operating means, and valve means interposed in the conduit for selectively controlling said communication and hence the operation of said brakes.

4. In a drive mechanism, in combination, a drive shaft, a first gear on said drive shaft, a fluid brake on said first gear for optionally immobilizing said drive shaft, a second gear journaled on said shaft, a carrier journaled on said shaft, a planet gear on said carrier engaging said first and second gear, a fluid brake on said carrier for optional immobilization thereof to cause rotation of said first and second gears in opposite directions, means for supplying fluid to said brakes, valve means controlling the supply of fluid to said brakes, means operable in the released position of said brakes for drivingly connecting said second gear and said drive shaft, a driven shaft, and means drivingly connecting said second gear and said driven shaft.

5. In a drive mechanism, in combination, a drive shaft, a first gear on said drive shaft, a fluid brake on said first gear for optionally immobilizing said drive shaft, a second gear journaled on said shaft, a carrier journaled on said shaft, a planet gear on said carrier engaging said first and second gears, a fluid brake on said carrier for optionally immobilization thereof to cause rotation of said first and second gears in opposite directions, means for supplying fluid to said brakes, valve means controlling the supply of fluid to said brakes, clutch elements engageable in the released position of said brakes to drivingly connect said second gear and said drive shaft, and means operable pursuant to movement of said clutch parts into and out of engagement for controlling the operation of said valve means.

6. In a reversing gearing; a drive shaft; a first gear drivable by and coaxial of the drive shaft; a brake optionally operable to hold said shaft and gear from rotating; a second gear rotatable coaxially of the shaft; a carrier rotatable coaxially of the shaft; planetatable gears journaled on the carrier and mutually meshed with said gears; a brake optionally operable to hold said carrier from rotating to mobilize the planetatable gears for transmitting force from the first to the second gear to cause the latter to rotate oppositely to the first; brake applying means operable to selectively apply said brakes; clutch elements meshable to drivingly connect the second gear and said shaft, control means operable to coordinately control said brake applying means and said clutch elements for meshing the latter when the brakes are released and for applying the first brake to hold said shaft against rotation when said clutch elements are demeshed.

7. In a reversing gearing; a drive shaft; a driven shaft; a first gear coaxial with the drive shaft and constrained for rotation therewith; a first brake optionally operable to hold said shaft and gear from rotating; a second gear rotatable coaxially of and relatively to said shaft; a carrier rotatable coaxially of and relatively to said shaft and said gears; planetary gears journalled on the carrier and mutually meshed with said gears; a second brake optionally operable to hold said carrier from rotating to mobilize said carrier and said gears for transmitting force from the first to the second gear to cause the latter to rotate oppositely from the first; clutch elements meshable to drivingly connect the second gear for rotation with said shaft; and control means for applying or releasing said brakes coordinately with meshing or demeshing said clutch elements comprising a control member having a neutral position from which it is selectively settable into a forward position or a reverse position, said control means being operable to incur a demeshed condition of the clutch elements, an applied condition of the second brake and a released condition of the first brake while the control member is in the reverse position, to incur a demeshed condition of the clutch elements, an applied condition of the first brake and a released condition of the second brake while the control member is in the neutral position, and to incur a meshed condition of said clutch elements and a released condition of both brakes while the control member is in the forward position.

OSCAR H. BANKER.

REFERENCES CITED

The following references are of record in the file of this patent:

UNITED STATES PATENTS

| Number | Name | Date |
|---|---|---|
| 707,396 | Darling et al. | Aug. 19, 1902 |
| 795,499 | Evans et al. | July 25, 1905 |
| 1,098,403 | Reck | June 2, 1914 |
| 1,653,262 | Dickson | Dec. 20, 1927 |
| 1,681,384 | Waters | Aug. 21, 1928 |
| 1,932,983 | Morgan | Oct. 31, 1933 |
| 2,018,014 | Fahiney | Oct. 22, 1935 |
| 2,156,118 | Kliesrath | Apr. 25, 1939 |
| 2,304,031 | Schmitter | Dec. 1, 1942 |
| 2,309,051 | Dodge | Jan. 19, 1943 |
| 2,320,727 | Sinclair | June 1, 1943 |
| 2,361,357 | Schmitter | Oct. 24, 1944 |

FOREIGN PATENTS

| Number | Country | Date |
|---|---|---|
| 660,610 | Germany | May 30, 1938 |